(12) United States Patent
Sahita et al.

(10) Patent No.: US 8,578,080 B2
(45) Date of Patent: Nov. 5, 2013

(54) SECURE HANDLING OF INTERRUPTED EVENTS UTILIZING A VIRTUAL INTERRUPT DEFINITION TABLE

(75) Inventors: Ravi L. Sahita, Portland, OR (US); Xiaoning Li, Hillsboro, OR (US); Manohar R. Castelino, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 13/175,544

(22) Filed: Jul. 1, 2011

(65) Prior Publication Data

US 2013/0007325 A1 Jan. 3, 2013

(51) Int. Cl.
*G06F 13/32* (2006.01)
*G06F 13/24* (2006.01)

(52) U.S. Cl.
CPC .................................. *G06F 13/24* (2013.01)
USPC ........................ 710/267; 710/266; 710/260

(58) Field of Classification Search
USPC ..................................... 710/260–269, 48–50
See application file for complete search history.

(56) References Cited

U.S. PATENT DOCUMENTS

| | | | | |
|---|---|---|---|---|
| 4,838,849 A * | 6/1989 | Calari | ............................. | 494/85 |
| 6,343,708 B1 * | 2/2002 | Riso | ............................. | 220/23.88 |
| 7,039,738 B2 * | 5/2006 | Plummer et al. | ............. | 710/260 |
| 7,048,877 B2 * | 5/2006 | Zimmer et al. | ............... | 710/260 |
| 7,209,994 B1 * | 4/2007 | Klaiber et al. | ................. | 710/264 |
| 8,032,897 B2 * | 10/2011 | Serebrin | ........................ | 719/318 |
| 8,180,944 B2 * | 5/2012 | Serebrin et al. | ............... | 710/269 |
| 8,234,432 B2 * | 7/2012 | Serebrin | ........................ | 710/268 |
| 8,266,162 B2 * | 9/2012 | Cava | ............................. | 707/755 |
| 2006/0230209 A1 * | 10/2006 | Gregg et al. | ................... | 710/263 |
| 2006/0265535 A1 * | 11/2006 | Ohtsuka | ........................ | 710/260 |
| 2008/0016264 A1 | 1/2008 | Chih-Wei | | |
| 2009/0070546 A1 | 3/2009 | Choudhury et al. | | |
| 2009/0241189 A1 * | 9/2009 | Shanbhogue et al. | ........... | 726/23 |
| 2010/0185876 A1 | 7/2010 | Kim | | |
| 2010/0191885 A1 * | 7/2010 | Serebrin et al. | ............... | 710/260 |
| 2010/0191887 A1 * | 7/2010 | Serebrin | ........................ | 710/267 |
| 2010/0191888 A1 * | 7/2010 | Serebrin et al. | ............... | 710/269 |
| 2010/0274940 A1 * | 10/2010 | Ahmad et al. | ................. | 710/267 |
| 2011/0197004 A1 * | 8/2011 | Serebrin et al. | ............... | 710/267 |

OTHER PUBLICATIONS

International Search Report and Written Opinion mailed Nov. 28, 2012 for PCT Application No. PCT/US2012/045131, 8 pages.

* cited by examiner

*Primary Examiner* — Raymond Phan (74) *Attorney, Agent, or Firm* — Schwabe, Williamson & Wyatt, P.C.

(57) ABSTRACT

Various embodiments of this disclosure may describe method, apparatus and system for reducing system latency caused by switching memory page permission views between programs while still protecting critical regions of the memory from attacks of malwares. Other embodiments may be disclosed and claimed.

20 Claims, 7 Drawing Sheets

SECURE HANDLING OF INTERRUPTED EVENTS UTILIZING A VIRTUAL INTERRUPT DEFINITION TABLE

TECHNICAL FIELD

The present disclosure generally relates to the field of data processing, in particular, to accessing secured interrupt handlers using virtualized interrupt descriptor tables (VIDTs), having particular application to virtualization, e.g., reducing system latency while preventing malware attacks.

BACKGROUND

Unless otherwise indicated herein, the materials described in this section are not prior art to the claims in this application and are not admitted to be prior art by inclusion in this section.

Traditional Operating Systems (OSes) may operate under several privilege levels, which for some implementation, are also referred to as ring levels. Among these ring levels, protected programs, such as parts of the kernel, usually operate at the highest privilege level (ring 0), and unprotected programs, such as user level applications, usually operate at a lower privilege level (e.g., ring 3). The ring-based privilege model may shield the protected programs from the unprotected programs. However, assigning all the protected programs into the same ring level is a monolithic protection model. As such, such operating environments may still be vulnerable to attacks from malwares (virus/rootkits) that are able to gain the higher privilege levels. Once a malware is elevated to the higher privilege level (e.g., ring 0), it may have the ability to intercept and alter system information, and may remove all traces of its existence, thereby preventing the detection of the malware. As such, malwares such as rootkits may be difficult to detect. In certain cases, even if detected, remediation or removal of these malwares may be difficult. The exposure is further magnified in the context of virtualization with multiple virtual machines, where compromise in one virtual machine may put the other virtual machines at risk.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Unless otherwise specified in the present disclosure, the term "processor" refers to physical computer chips and integrated circuits, which may be fabricated using semi-conductive and conductive materials. An example of processor is a central processing unit (CPU) manufactured by Intel Corp. Further, unless otherwise specified in the present disclosure, a processor may include one or more processing units, which may be referred to as "cores" of the processor.

Unless otherwise specified in the present disclosure, the terms such as "program," "process," "thread," "stub," "code," and the like refer to a path of execution by a processor or by a core of a processor, and may be considered synonymous.

Various embodiments of this disclosure may describe a method, apparatus and system associated with accessing a secured interrupt handler using a VIDT, which may reduce system latency when switching memory page permission views between programs, to protect critical regions of memory from attacks of malwares.

With the advancement in virtualization technology, a virtual machine manager (VMM) managing multiple virtual machines operating on a computer system may provide fine-grained protection for the computing system, while maintaining compatibility with the traditional operating system and their privilege based protection scheme. Programs in such a virtualized system may operate, in addition to the traditional privilege levels, in a virtual machine extension (VMX) root mode or a VMX non-root mode. The VMM may allow programs running at the VMX root mode to monitor and protect resources accessed by programs operating at the VMX non-root mode. The VMM may also manage a hardware based page table that facilitates translation of guest physical memory addresses to host physical memory addresses of a memory of the computer system. An example of this hardware based page table may include the Extended Page Tables (EPT) available in certain processors manufactured by Intel Corporation at Santa Clara, Calif.

In various embodiments, the VMM may be configured to protect one or more physical memory pages of the memory by restricting access to these memory pages. A system root agent operating in the VMM-root mode may be established by the VMM so that any attempts to write to any of the protected host memory pages where the system root agent resides may be trapped by the processor and reported to the VMM as a violation. Unless otherwise specified in the present disclosure, the term "host memory page," or "memory page" in short, refers to memory pages mapped to the physical memory of a computing system that is managed by the VMM and/or the EPT, not virtual memory pages managed by a particular virtual machine (VM) and/or its page table.

In various embodiments, once the system root agent is up and running, it may set up additional protections for other memory regions of the system. For example, the system root agent may restrict the ability of a process to read, write, and/or execute contents stored in a host memory page. These restrictions to access the host memory pages may be referred to as permission views. Permission views of the one or more memory pages may be encoded in the EPT, and controlled by the VMM. Therefore, the VMM may enforce these views (i.e., permissions) regardless of the permissions conferred to a process within a guest OS. For example, the guest OS may grant both a kernel driver A and a kernel driver B full access to a particular memory page. However, permission views set up by the system root agent, encoded in the EPT, and enforced by the VMM may allow only the kernel driver A to have full access to the host memory page, and allow kernel driver B to have read-only access. Resultantly, the VMM may further restrict the privileges granted by the guest OS.

In various embodiments, an access violation to a memory page based on the permission view may raise an exception, and may cause control to be transferred to the VMM. For example, when a thread of execution enters into a protected guest OS program, an access violation may trigger a fault or a trap, (for example, an EPT fault), which may cause execution control to be transferred to the VMM. In various embodiments, execution control may be transferred from the guest OS to the VMM due to a vmexit call, which may be triggered due to the EPT fault. A permission view handler in the VMM may then analyze the access violation to determine whether the access may be denied or granted. Not all permission violations may indicate a malware infection. For example, the permission view handler may verify whether the destination guest linear address associated with the access event that triggered the execution control transfer is a legitimate destination. Upon verification, the permission view handler may switch the active EPT, or a portion of it, to an EPT that allows execution of the process at the destination guest linear address. In various embodiments, the VMM's permission view handler may change the permission views associated with a memory page by modifying the active EPT to allow the memory access to go through. In various embodiments, after the memory access is completed, the VMM may transfer control back to the guest OS, for example, via a vmentry call.

In various embodiments, encoding permission view in the EPT may define protection of critical system regions in a process by process manner, and reduce the likelihood of malware attacks. However, generating an exception, e.g., an EPT fault, on each access violation may cause legitimate permission view switches to go through two VM exit round trips (e.g., vmexit and vmentry calls), which may cause additional delay in execution.

In various embodiments, the processor of the computing system may be configured to support an explicit permission view switch instruction (view switch instruction) that may be used to reduce the overhead, and therefore, the latency of switching the permission views.

Figure 1:
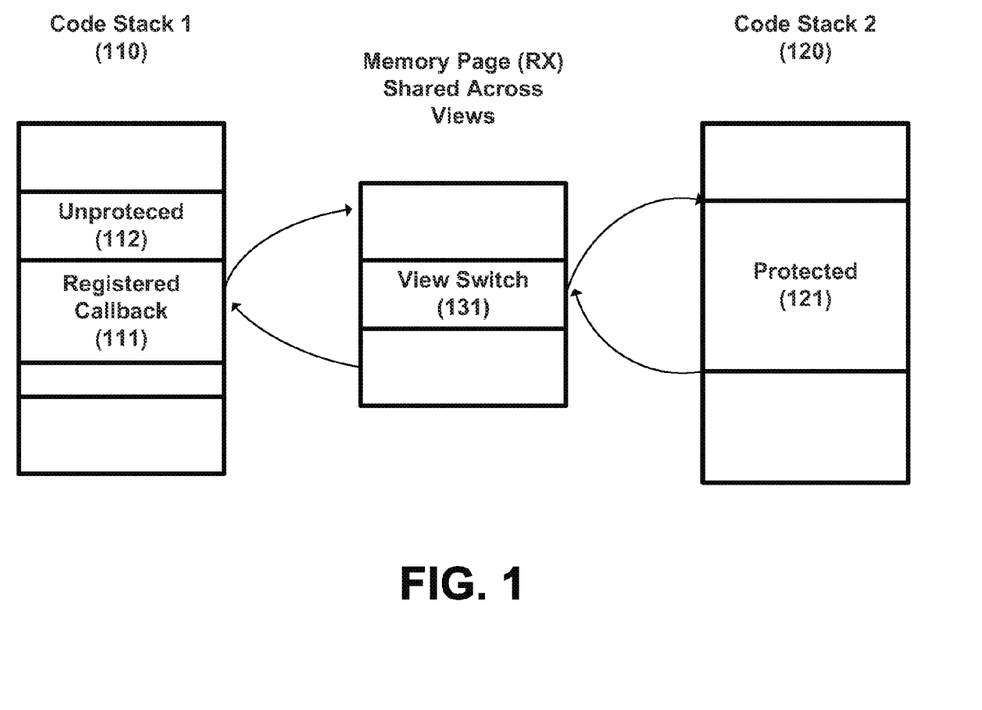
FIG. 1 is a block diagram illustrating an example usage of a memory view switch instruction, in accordance with various embodiments of the present disclosure.

FIG. 1 is a block diagram illustrating an example usage of a view switch instruction, in accordance with various embodiments of the present disclosure. In various embodiments, a first code stack 110 may include an unprotected program 112 and a registered callback 111 which is associated with a protected program 121. The protected program 121 may reside in a second code stack 120. The unprotected program 112 may access the protected program 121 and its service via the registered callback 111. The unprotected program 112, by default, may have a read-only permission view for the host memory page (not shown) that contains the protected program 121. The unprotected program 112 therefore may not have permission to directly execute the protected program 121 under its own permission view.

In various embodiments, the callback routine 111 may invoke one or more view switch instructions 131 to allow the unprotected program 112 to switch to a permission view of the protected program 121, thereby negating the need and overhead of e.g., a vmexit call. Similarly, the protected program 121 may also invoke the one or more view switch instructions 131 to allow the protected program 121 to safely exit and switch back to the unprotected program 112, thereby negating the need, and overhead of e.g., a vmentry call. In various embodiments, at least a portion of the memory page that contains the one or more view switch instructions 131 may share a read/execute permission view for both the protected program 121 and the unprotected program 112.

In various embodiments, as illustrated in FIG. 1, the view switch instructions 131 may reduce system latency so long as the need to enter into or exit from the protected program 121 may be predicted a priori, such as when invoked in the registered callbacks 111. However, asynchronous events, such as interrupts, may happen anytime during executions of protected or unprotected programs. When the processor receives a notification that an interrupt occurred, the processor may jump to, or trigger execution of, an interrupt handler routine that is associated with the interrupt. The address of the interrupt handler routine may be found in an interrupt description table (IDT) maintained by a guest OS. The processor may attempt to execute the interrupt handler to service the interrupt. However, if the permission views of the interrupt handler and the program that is interrupted (the "interrupted program") are different, an access violation may still occur, causing an exception to be raised, and the execution control to be transferred to/from the VMM via the vmexit and/or vmentry calls, which may lead to extra delay.

To further reduce the delay associated with the handling of the asynchronous events, in various embodiments, a virtualized IDT (VIDT) may be used. In various embodiments, a VIDT may include one or more exit stubs and one or more re-entry stubs. In various embodiments, the VIDT may include a single exit stub. In various embodiments, the number of re-entry stubs may correspond to the number of protected programs of the guest OS. A VIDT exit stub may be configured to switch the permission view of the interrupted program into the permission view of the interrupt handler registered in the IDT, using the view switch instruction. A VIDT re-entry stub may be configured to switch the permission view of the interrupt handler back to the permission view of the interrupted program, using the view switch instruction. These and other aspects associated with VIDT and its usage will be further described in the disclosure to follow.

Figure 2:
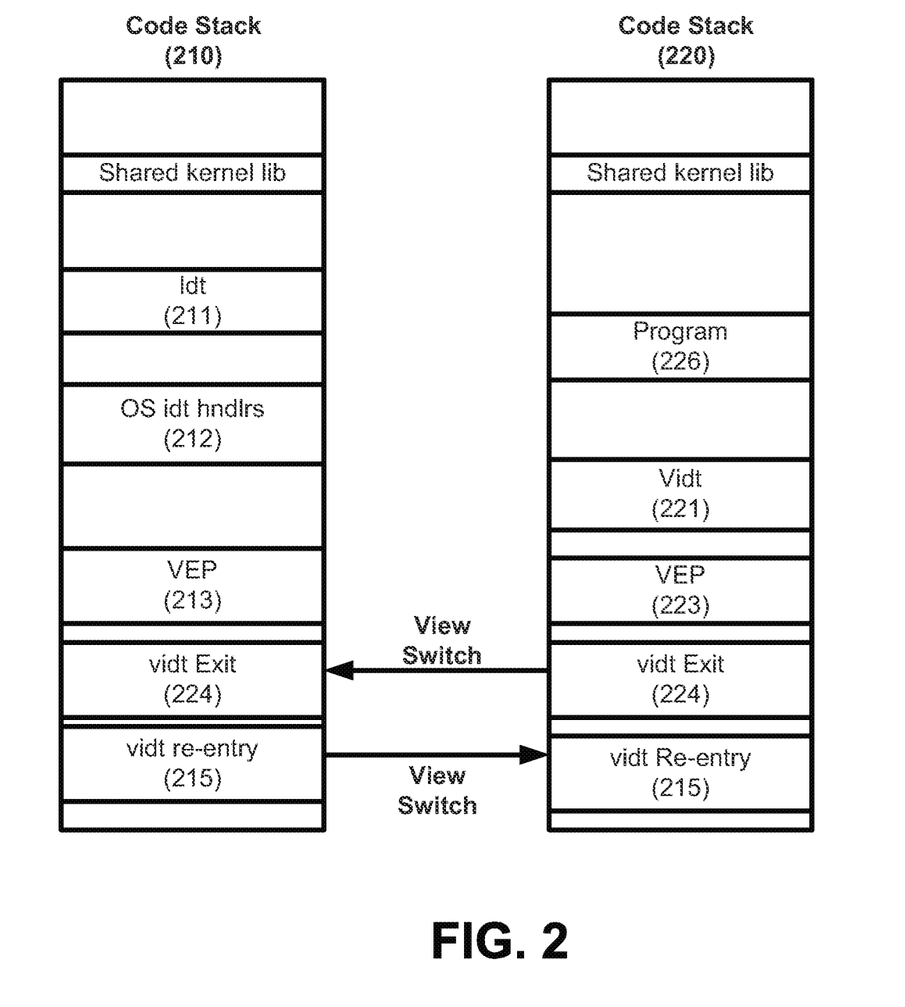
FIG. 2 is a block diagram illustrating an example usage of a VIDT to reduce system latency during an asynchronous event, in accordance with various embodiments of the present disclosure.

FIG. 2 is a block diagram illustrating an example of using the VIDT to reduce system latency during an asynchronous event, in accordance with various embodiments of the present disclosure. As illustrated, a program 226 operating in a guest OS, which may or may not be protected, may have a program stack 220. An interrupt may occur during execution of the program 226. The interrupt may correspond to an interrupt handler residing in a protected memory page. The program 226 may lack permission to access the memory page to execute directly the interrupt handler under its own permission view, without causing an access violation.

In various embodiments, upon receiving a notification of the interrupt, the processor may jump to a VIDT exit stub 224 located in a VIDT 221, and may execute the VIDT exit stub 224. In various embodiments, except to a system root agent, the VIDT 221 may reside in a host memory page that has a permission view of read-only to all other programs to disallow tampering of the VIDT 221.

In various embodiments, the VIDT exit stub 224 may be configured to check the current permission view of the program 226. In various embodiments, the current view may be fetched by reading a reserved memory page, which may be referred to as a Current View Page (CVP). In various embodiments, the CVP may have a permission view of read-only to all programs of the guest OS. In various embodiments, the current view of the program 226 may be fetched from the CVP in an atomic operation, e.g., the processor may not receive another interrupt while the current view of the program 226 is being fetched.

In various embodiments, the VIDT exit stub 224 may be configured to obtain a return instruction pointer (RIP) of the interrupt frame in a register of the processor, for example, in the CS register available in x86 based processors. In various embodiments, the program 226 may be a protected program and may correspond to a VIDT re-entry stub 215. The VIDT exit stub 224 may replace the RIP with the location of the VIDT re-entry stub 215, and may save the address of the original RIP with the current thread/process identification number in a view exclusive page (VEP) 223. The VIDT exit stub 224 may also save the current permission view of the program 226 in the VEP 223. The VEP 223 may carry read/write permission for the program 226, but may have a read-only permission for other programs.

In various embodiments, the VIDT exit stub 224 may be configured to look up the original interrupt handler 212 that corresponds to the received interrupt from the IDT. The interrupt handler 212 may be secured in a protected memory page that the program 226 may lack permission to access, or trigger execution of the interrupt handler 212 under the permission view of the program 226.

In various embodiments, the VIDT exit stub 224 may be configured to perform a latency reduced view switch to switch the permission view to a view associated with the interrupt handler 212. The VIDT exit stub 224 may switch the permission view to allow execution of the interrupt handler 212 without causing an access violation and delays associated with e.g., a vmexit call. The VIDT exit stub 224 may do so by using the explicit view switch instruction as previously disclosed. After the view switch, under the permission view of the interrupt handler 212, the VIDT exit stub 224 may be configured to cause the processor to jump to the address of the interrupt handler 212 and trigger the execution of the interrupt handler 212. Since the VIDT exit stub 224 is already view-switched into the interrupt handler's permission view, execution of the interrupt handler 212 may not cause an EPT fault.

In various embodiments, after the processor completes execution of interrupt handler 212, the processor may jump to the RIP of the current frame, which may correspond to the VIDT re-entry stub 215. The VIDT re-entry stub 215 may be configured to read the required permission view from the VEP 223. In various embodiments, the VEP 223 may be read-only to the VIDT re-entry stub 215 under the permission view of the interrupt handler 212.

In various embodiments, the VIDT re-entry stub 215 may be configured to perform a latency reduced view switch to switch the permission view of the interrupt handler 212 to the permission view of the program 226. After the view switch, under the permission view of the program 226, the VIDT re-entry stub 215 may read the VEP 223 to locate the saved RIP return address for the program 226, and cause the processor to jump to the interrupted address point of the program 226.

In various embodiments, address ranges of one or more protected programs of the guest OS may be registered in a protected data structure referred to as a global linear address (GLA) range table. In various embodiments, the VIDT exit stub 224 may find the specific VIDT re-entry stub 215 corresponding to the protected program 226 based on the address of the interrupted location of the program 226.

In various embodiments, in order to protect the VIDT, the VIDT may have a permission view of allowing read/write only by a system root agent. For all other programs operating in the guest OS, the VIDT may have a permission view of read-only. In various embodiments, the VIDT may be set up by the system root agent. In various embodiments, the VIDT may be setup along with the initialization of the system root agent.

Figure 3:
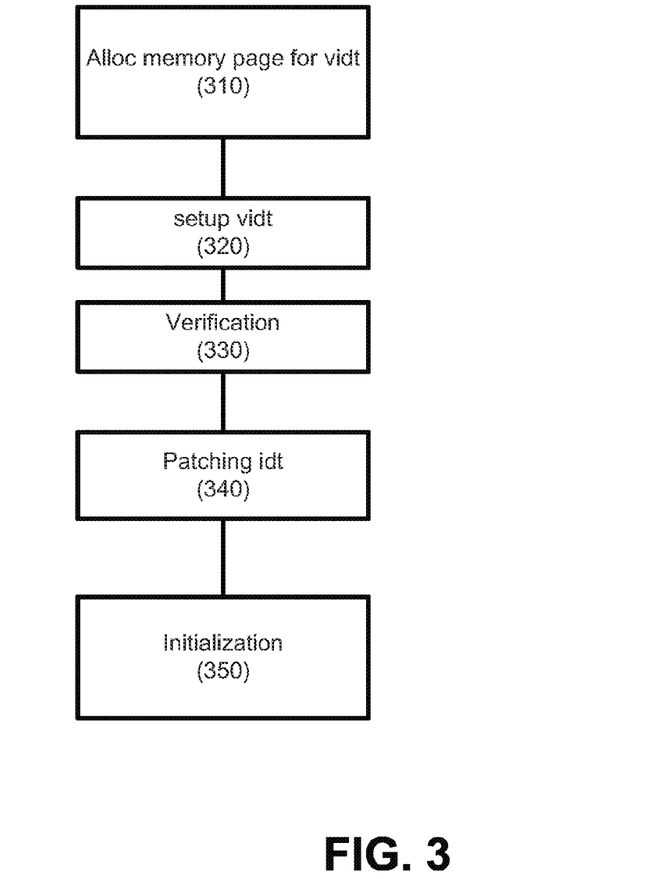
FIG. 3 is a flow diagram illustrating selected operations associated with setting up a VIDT of a guest OS, in accordance with various embodiments of the present disclosure.

FIG. 3 is a flow diagram illustrating selected operations associated with setting up a VIDT of a guest OS, in accordance with various embodiments of the present disclosure. In block 310, a system root agent may allocate a memory page for the VIDT 221. In various embodiments, the system root agent may also allocate memory pages for one or more redirect tables. Each one of the one or more redirect tables may include addresses of the original interrupt handler and the address of the VIDT exit/re-entry stubs. In various embodiments, the system root agent may setup a number of redirect tables corresponding to a number of physical processing units (e.g., processing cores) that may be available in the processor. For example, if the processor of the computing device includes 8 processing cores, the system root agent allocates memory for 8 redirect tables, one for each core of the processor. In various embodiments, the system root agent may also setup error codes and other entry specific codes.

In block 320, the system root agent may setup the VIDT 221. In various embodiments, the system root agent may setup the VIDT 221 by making a specific system call to VMM. In various embodiments, the specific system call may be a vmcall instruction.

In block 330, after receiving the vmcall from the system root agent, the VMM may take the control from the system root agent, and verify the identity of the system root agent. The VMM may verify the identity of the system root agent by checking the address of the instruction pointer of the system root agent that made the vmcall against the GLA range tables. In various embodiments, the VMM may also bring all the cores of the processor into a rendezvous state.

In block 340, the VMM may provision the one or more redirect tables with the addresses of the original interrupt handler of the guest OS. In various embodiments, the VMM may perform the provisioning of the one or more redirect tables for each core of the processor.

In block 350, the VMM may perform various initializations to maintain compatibility. For example, in various embodiments, the VMM may initialize the guest OS store/load interrupt descriptor table handlers (e.g., sidt handler and lidt handler) so that program compatibility may be maintained. Afterwards, all interrupt handling may go through VIDT 221 rather than the original IDT 211.

Figure 4:
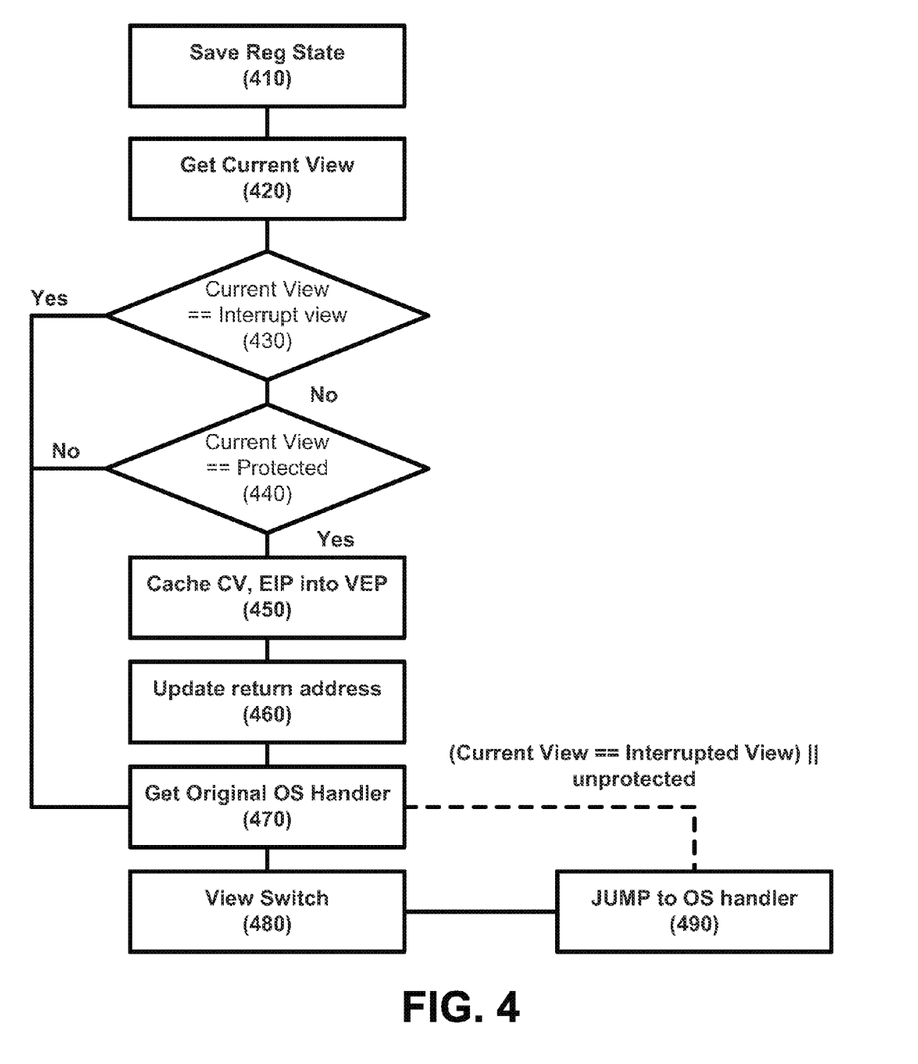
FIG. 4 is a flow diagram illustrating selected operations of a VIDT exit stub, in accordance with various embodiments of the present disclosure.

FIG. 4 is a flow diagram illustrating selected operations of a VIDT exit stub, in accordance with various embodiments of the present disclosure. In block 410, the VIDT exit stub 224 may be configured to save the states of the various registers of the processor onto the stack of the process. In block 420, the VIDT exit stub 224 may be configured to retrieve the current permission view of the program 226 from the CVP. In block 430, the VIDT exit stub 224 may be configured to compare the permission view of the interrupted program 226 with the view of the interrupt handler 212. If the VIDT exit stub 224 determines that the permission view of the interrupted program 226 equals the permission view of the interrupt handler 212, then the VIDT exit stub 224 may be configured to directly get the address of the interrupt handler 212 in block 470. In various embodiments, the VIDT exit stub 224 may restore the processor registry states from the OS stack and cause the processor to jump to the address of the interrupt handler 212 and execute the interrupt handler 212 in block 490. Since the permission view of the interrupted program and the interrupt handler are the same, executing the interrupt handler 212 would not cause a violation of the permission view.

In various embodiments, for handling the situation where the VIDT exit stub 224 determines that the permission view of the interrupted program 226 does not equal the permission view of the interrupt handler 212, the VIDT exit stub 224 may be configured to further determine whether the interrupted program 226 is a protected program in block 440. This may include comparing the address pointer of the interrupted program with the GLA range tables. If the VIDT exit stub 224 determines that the interrupted program 226 is a protected program, the VIDT exit stub 224 may cache the permission view of the interrupted program 226 and the current states of the various registers, including instruction pointers, into the VEP, under the thread/process id of the interrupted program 226, in block 450. In various embodiments, in block 460, the VIDT exist stub 224 may update guest OS interrupt stack frame return address (RIP) to the address of the VIDT re-entry stub 215 corresponding to the interrupted program 226. In block 470, the VIDT exit stub 224 may be configured to get the address of the interrupt handler 212. In block 480, the VIDT exit stub 224 may be configured to invoke the view switch instruction to switch to the permission view of the interrupt handler 212. In block 490, under the permission view of the interrupt handler 121, the VIDT exit stub 224 may be configured to restore the processor registry states from the stack, and cause the processor to jump to the address of the interrupt handler 212. Since the permission view is already changed, execution of the interrupt handler 212 may not cause a violation, and the delay associated with e.g., vmexit/vmentry calls may be avoided.

In various embodiments, for handling the situation where the VIDT exit stub 224 determines that the interrupted program 226 is not a protected program, the VIDT exit stub 224 may be configured to get the address of the interrupt handler 212 in block 470, and cause the processor to jump to the address of the interrupt handler 212 in block 490. Since the interrupted program 226 and the interrupt handler 212 have different permission views, executing the interrupt handler 212 may cause an access violation, which may cause delay due to the long latency associated with e.g., vmexit/vmentry calls. Nevertheless, allowing interrupts to proceed during execution of the unprotected programs 226 may ensure compatibility with legacy programs that have not been adapted to the new protection scheme.

Figure 5:
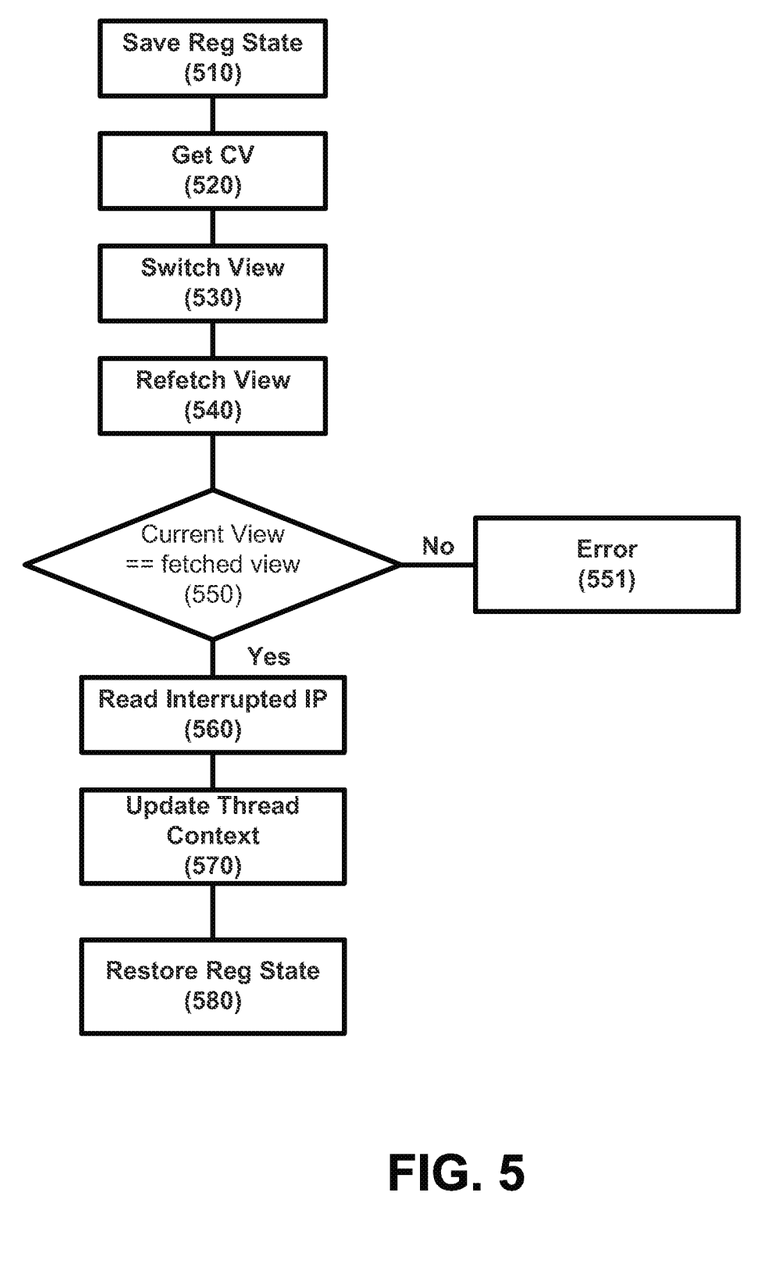
FIG. 5 is a flow diagram illustrating selected operations of a VIDT re-entry stub, in accordance with various embodiments of the present disclosure.

FIG. 5 is a flow diagram illustrating selected operations of a VIDT re-entry stub, in accordance with various embodiments of the present disclosure. For processing after the interrupt handler 212 completed its execution and returned to the VIDT re-entry stub 215, in block 510, the VIDT re-entry stub 215 may be configured to save processor registry states on the stack of the guest OS. In block 520, the VIDT re-entry stub 215 may be configured to retrieve permission view of the interrupt handler 212 from the CVP. In block 530, the VIDT re-entry stub 215 may be configured to retrieve the permission view of the interrupted program 226 from the VEP. If the permission view retrieved from the CVP does not equal the permission view retrieved from the VEP, the VIDT re-entry stub 215 may call the view switch instruction to switch to the permission view of the interrupted program 226.

In various embodiments, for processing after the view switch, under the interrupted program's permission view, the VIDT re-entry stub 215 may be configured to re-fetch the permission view of the interrupted program 226 in block 540. In block 550, the VIDT re-entry stub 215 may be configured to compare the current permission view (after the view switch) with the re-fetched permission view. If the VIDT re-entry stub 215 determines that these two permission views are not equal, the VIDT re-entry stub 215 may raise an error to the VMM. In various embodiments, the VIDT re-entry stub 215 may raise the error by invoking the vmcall instruction.

In various embodiments, if the VIDT re-entry stub 215 determines that the current permission view (after view switch) and the re-fetched permission view from the VEP are equal, the VIDT re-entry stub 215 may read the RIP of the interrupted program 226 from the VEP, in block 560. In block 570, the VIDT re-entry stub 215 may update the processor's thread context register to remove the last state. In various embodiments, the update of the thread context register may be an atomic operation to prevent the thread context register from being updated due to occurrences of other asynchronous events or interrupts. In various embodiments, in block 580, the VIDT re-entry stub 215 may restore the registry state from the stack, and cause the processor to jump to the address of the interrupted program 226, and continue its execution.

Figure 6:
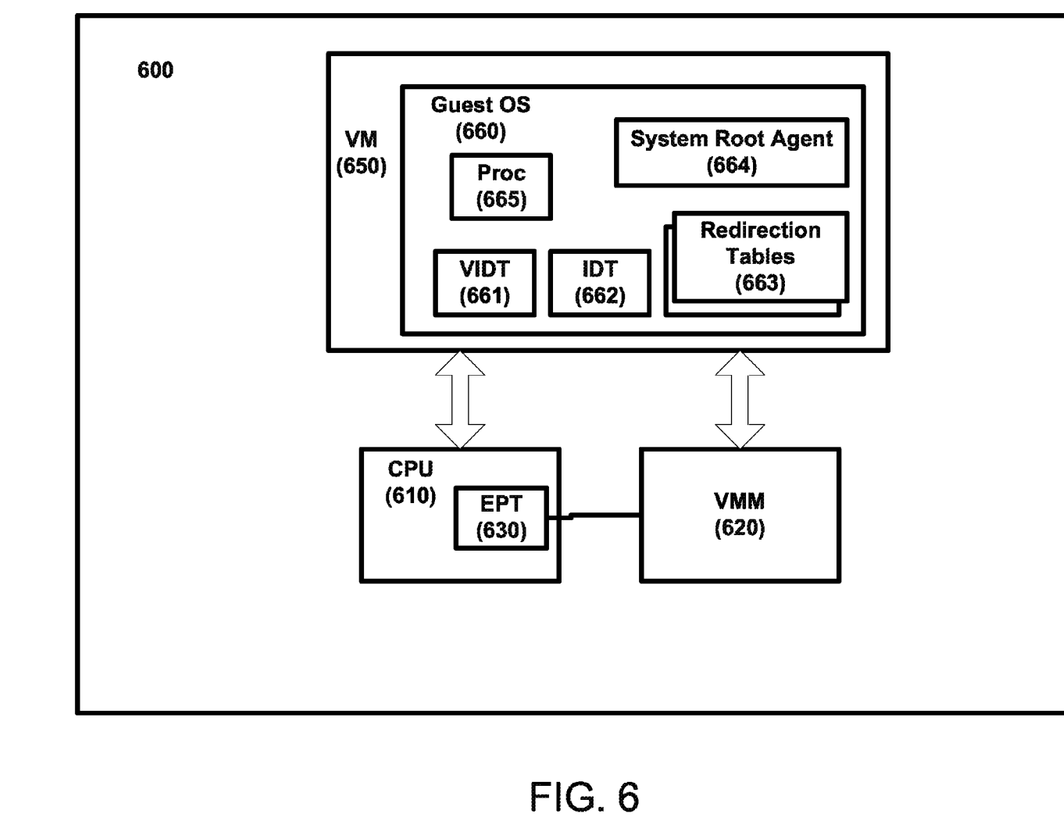
FIG. 6 illustrates a block diagram of an example computing device with VIDT support, in accordance with various embodiments of the present disclosure.

FIG. 6 illustrates a component view of a computing device with the VIDT support, in accordance with various embodiments of the present disclosure. In various embodiments, a computing device 600 may be configured to use the described VIDT and the associated methods to reduce system latency for handling of asynchronous events, as earlier described. The computing device 600 may include a processor 610 configured to operate a VMM 620. The processor 610 may include multiple processing cores, and may also include support for an EPT 630. In various embodiments, the VMM 620 may be configured to manage the EPT 630. In various embodiments, the processor 610 may be configured to support a plurality of virtual machines (VM), under the management of VMM 620, including a VM 650 as illustrated in FIG. 6. In various embodiments, during operation, a guest OS 660 may be operated within the VM 650. The guest OS 660 may be configured to operate a plurality of protected and unprotected programs. One of the protected programs may be a system root agent 664. The system root agent 664 may be configured to allocate memory for a VIDT 661, and call the VMM 620 to setup the VIDT 661. The VIDT 661 may include a VIDT exit stub and a VIDT re-entry stub as earlier described.

In various embodiments, the guest OS 660 may be configured to support an IDT 662, and one or more redirection tables 663. The IDT 662 may include a plurality of interrupt handlers that respectively correspond to various interrupts that the processor 610 may receive during execution of the guest OS 660. The redirection tables 663 may be configured to store addresses of various interrupt handlers and the VIDT exit stub. In various embodiments, the number of redirection tables 663 supported in the guest OS 660 may correspond to the number of processing cores available in the processor 610.

In various embodiments, the processor 610 may be configured to receive an interrupt, while executing a process 665 within the guest OS 660,. Rather than invoking an interrupt handler defined in the IDT 662 for the received interrupt, the processor 610 may be configured to execute the VIDT exit stub. In various embodiments, upon detection that the process 665 may not have access permission to execute the interrupt handler corresponding to the interrupt under its own permission view, the VIDT exit stub may switch the permission view of a memory page holding the interrupt handler to allow execution of the interrupt handler without causing an access violation, as previously disclosed.

Figure 7:
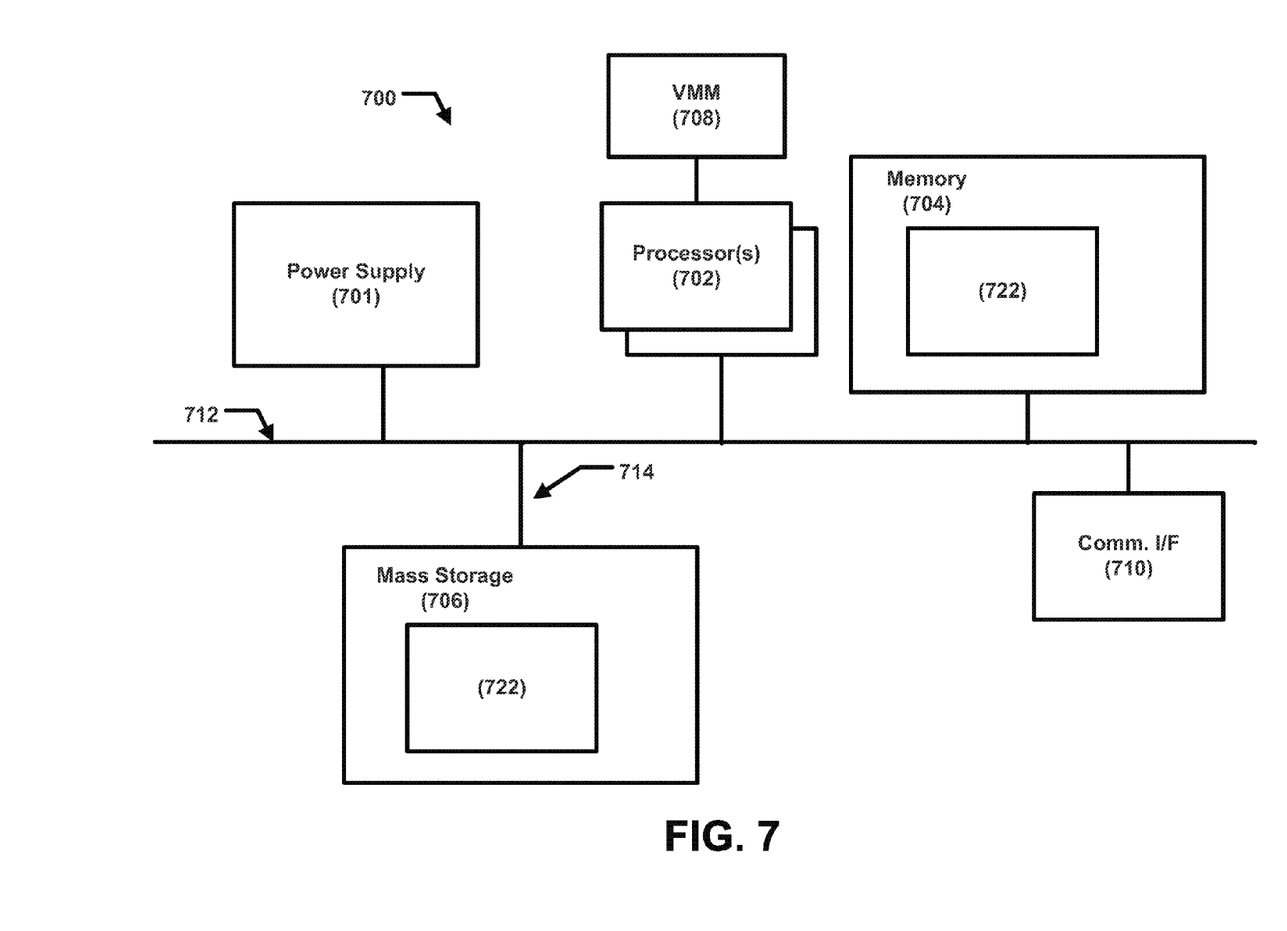
FIG. 7 is a block diagram illustrating an example computer system incorporated with various aspects of the described methods and/or apparatus, in accordance with various embodiments of the present disclosure.

FIG. 7 illustrates another component view of a computer system incorporated with various aspects of the earlier described methods and apparatuses, in accordance with various embodiments of the present disclosure. As shown, a computer system 700 may include a power supply unit 701, a number of processors 702 coupled to a VMM 708, a number of tangible, non-transitory storage mediums (such as, system memory 704, and mass storage 706), a communication interface 710. In various embodiments, the processor 702 and the VMM 708 may be configured to support the view switch instruction, and may be configured to operate and manage one or more VMs and guest OSes. The one or more guest OSes may be configured to support a VIDT including a VIDT exit stub and one or more VIDT re-entry stubs. The process may be configured to trigger execution of the VIDT exit stub upon receiving an interrupt.

Additionally, the computing system 700 may include one or more tangible, non-transitory computer-readable mass storage devices 706 (such as diskette, hard drive, compact disc read only memory (CDROM) and so forth) that are based on standards such as PCIe, USB, etc. In various embodiments, the mass storage devices 706 may be coupled to a system bus 712 via an I/O interconnect 714.

The system memory 704 and the mass storage 706 may be employed to store a working copy and a permanent copy of the programming instructions implementing one or more operating systems, firmware modules or drivers, applications, and so forth, including selected aspects of the earlier described VIDT and associated methods, herein collectively denoted as 722. The permanent copy of the programming instructions may be placed into the permanent storage 706 in the factory, or in the field, through, for example, a distribution medium (not shown), such as a compact disc (CD), or through the communication interface 710 (from a distribution server (not shown)). That is, one or more distribution media having an implementation of the agent program may be employed to distribute the agent and program various computing devices.

The remaining constitution of these elements 701-722 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A method, comprising:
    receiving, by a processor of a computing device, a notification of an asynchronous event during execution of a process, wherein the asynchronous event is associated with an interrupt handler secured in a protected memory page of a memory of the computing device, and the process lacks permission to access the memory page to trigger execution of the interrupt handler; and
    executing, by the processor, a virtual interrupt description table (VIDT) exit stub in response to the notification of the asynchronous event, wherein the VIDT exit stub is configured to cause the processor to perform operations including:
        switching from a first permission view associated with the process to a second permission view associated with the interrupt handler to allow the process to trigger execution of the interrupt handler; and
        triggering execution of the interrupt handler.

2. The method of claim 1, wherein the operations further include saving the first permission view in a view exclusive page (VEP) associated with the memory.

3. The method of claim 1, further comprising:
    initializing the VIDT by a system root agent and a virtual machine monitor (VMM) of the computing device.

4. The method of claim 1, wherein the operations further include determining, by the processor, whether the process is a protected process.

5. The method of claim 2, wherein the operations further include saving a return instruction pointer of the process in the VEP along with an identification of the process.

6. The method of claim 3, wherein the processor includes a plurality of processor cores, and wherein said initializing comprising initializing, by one of the processor cores, a interrupt redirection table for respective ones of the plurality of cores.

7. The method of claim 5, wherein the operations further include replacing the return instruction pointer of the process with an address of a VIDT re-entry stub.

8. The method of claim 7, further comprising:
    executing the VIDT re-entry stub, by the processor, after execution of the interrupt handler, including retrieving the first permission view from the VEP and switching the second permission view back to the first permission view.

9. The method of claim 7, wherein the operations further include:
    prior to said switching, saving, by the processor, registry states of the processor in a stack of the process; and
    after said switching and prior to said triggering execution of the interrupt handler, restoring, by the processor, the saved registry states from the stack.

10. The method of claim 8, wherein said executing of the VIDT re-entry stub further comprises restoring the return instruction pointer to a register of the processor and causing the processor to transfer execution control to the return instruction pointer.

11. An apparatus, comprising:
    a processor; and
    a memory coupled to the processor;

wherein the processor is configured to support a virtual machine having a guest operating system (OS) that includes a virtual interrupt description table (VIDT), the VIDT having a VIDT exit stub; and wherein the processor is further configured to:

support a process of the guest OS to trigger execution of the VIDT exit stub, in response to a notification of an interrupt received during execution of the process, to enable the VIDT exit stub to switch from a first permission view associated with the process to a second permission view associated with an interrupt handler, the interrupt handler associated with the interrupt, and trigger execution of the interrupt handler.

12. The apparatus of claim 11, wherein the processor is further configured to support an extended page table, wherein the extended page table is configured to store one or more permission views correspondingly associated with one or more respective processes executed by the processor.

13. The apparatus of claim 11, wherein the process is further configured to support a system root agent configured to be operated in the guest OS to allocate the VIDT; and the apparatus further comprising a virtual machine manager (VMM) configured to initialize the VIDT.

14. The apparatus of claim 11, wherein the VIDT further includes a VIDT re-entry stub.

15. The apparatus of claim 11, wherein the processor includes a plurality of processor cores, and the processor is further configured to support a plurality of redirection tables corresponding to the plurality of processor cores, where respective ones of the direction tables are configured to store addresses of the interrupt handler and the VIDT exit stub of the corresponding processor cores.

16. An article of manufacture, comprising:
a tangible and non-transitory storage medium;
instructions stored in the storage medium, which, in response to execution of the instructions by a processor of a computing device, cause the computing device to:

receive a notification of an asynchronous event during execution of a process, wherein the asynchronous event is associated with an interrupt handler secured in a protected memory page of a memory of the computing device, and the process lacks permission to access the memory page to trigger execution of the interrupt handler; and execute a virtual interrupt description table (VIDT) exit stub in response to the notification of the asynchronous event, wherein the VIDT exit stub is configured to cause the processor to:

switch from a first permission view associated with the process to a second permission view associate with the interrupt handler to allow the process to trigger execution of the interrupt handler; and trigger execution of the interrupt handler.

17. The article of claim 16, wherein the instruction further cause the computing device to save the first permission view in a view exclusive page (VEP) associated with the memory.

18. The article of claim 16, wherein the instructions further cause the computing device to:

save prior to said switch, registry states of the processor in a stack of the process; and restore, after said switch and prior to said trigger, the saved registry states from the stack.

19. The article of claim 17, wherein the instructions further cause the computing device to save a return instruction pointer of the process in the VEP along with an identification of the process.

20. The article of claim 19, wherein the instructions further cause the computing device to replace the return instruction pointer of the process with an address of a VIDT re-entry stub.

* * * * *

UNITED STATES PATENT AND TRADEMARK OFFICE
CERTIFICATE OF CORRECTION

PATENT NO.        : 8,578,080 B2
APPLICATION NO.   : 13/175544
DATED             : November 5, 2013
INVENTOR(S)       : Sahita et al.

It is certified that error appears in the above-identified patent and that said Letters Patent is hereby corrected as shown below:

In the Claims

Column 10
Line 41, "... comprising..." should read - ...comprises...
Line 41, "..., a interrupt..." should read - ..., an interrupt...

Column 12
Line 15, "...associate..." should read - ...associated...
Line 19, "...instruction..." should read - ...instructions...
Line 24, "save prior..." should read - save, prior...

Signed and Sealed this
Fifth Day of May, 2015

Michelle K. Lee
*Director of the United States Patent and Trademark Office*